US011301640B2

(12) United States Patent
Sankaran et al.

(10) Patent No.: US 11,301,640 B2
(45) Date of Patent: Apr. 12, 2022

(54) COGNITIVE ASSISTANT FOR CO-GENERATING CREATIVE CONTENT

(71) Applicant: International Business Machines Corporation, Armonk, NY (US)

(72) Inventors: Anush Sankaran, Bangalore (IN); Pranay Lohia, Bangalore (IN); Priyanka Agrawal, Bangalore (IN); Disha Shrivastava, Bangalore (IN); Anirban Laha, Bangalore (IN); Parag Jain, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 146 days.

(21) Appl. No.: 16/169,001

(22) Filed: Oct. 24, 2018

(65) Prior Publication Data

US 2020/0134089 A1 Apr. 30, 2020

(51) Int. Cl.
*G06F 40/56* (2020.01)
*G06N 3/04* (2006.01)
(Continued)

(52) U.S. Cl.
CPC .......... *G06F 40/56* (2020.01); *G06N 3/0445* (2013.01); *G06F 40/20* (2020.01); *G06Q 30/0276* (2013.01)

(58) Field of Classification Search
CPC ........ G06F 40/56; G06F 40/20; G06N 3/0445
See application file for complete search history.

(56) References Cited

U.S. PATENT DOCUMENTS 6,097,927 A * 8/2000 LaDue ............... A61M 21/0094
434/236
7,333,967 B1 * 2/2008 Bringsjord ............... G06N 5/00
706/45
(Continued)

FOREIGN PATENT DOCUMENTS

EP 2230607 A1 * 9/2010 ......... G06F 17/2247
WO WO-2018154092 A1 * 8/2018 .......... G06T 3/4046

OTHER PUBLICATIONS

Hong, Dapeng. "Attention-based Recurrent Neural Networks for Question Answering" (2017); 7 pages; https://web.stanford.edu/class/archive/cs/cs224n/cs224n.1174/reports/2761224.pdf (Year: 2017).*

(Continued)

*Primary Examiner* — Benjamin Smith
(74) *Attorney, Agent, or Firm* — Ryan, Mason & Lewis, LLP

(57) ABSTRACT

Methods, systems, and computer program products related to a cognitive assistant for co-generating creative content are provided herein. A computer-implemented method includes obtaining semantic-level inputs from at least one user, wherein the semantic-level inputs pertain to multiple aspects of a desired content narrative; generating textual content based at least in part on the semantic-level inputs, wherein said generating the textual content comprises applying one or more deep learning algorithms to the semantic-level inputs; generating image content based at least in part on the generated textual content; creating the desired content narrative by integrating (i) the generated textual content and (ii) the generated image content; and outputting the desired content narrative to the at least one user.

18 Claims, 8 Drawing Sheets

(51) Int. Cl.
*G06Q 30/02* (2012.01)
*G06F 40/20* (2020.01)

(56) References Cited

U.S. PATENT DOCUMENTS

| | | | |
|---|---|---|---|
| 7,912,868 B2 | 3/2011 | Calistri-Yeh et al. | |
| 7,921,036 B1 | 4/2011 | Sharma et al. | |
| 8,355,903 B1* | 1/2013 | Birnbaum | G06F 40/106 |
| | | | 704/9 |
| 8,630,844 B1* | 1/2014 | Nichols | G06F 40/151 |
| | | | 704/9 |
| 9,106,812 B1* | 8/2015 | Price | H04N 21/8549 |
| 9,208,147 B1* | 12/2015 | Nichols | G06N 5/02 |
| 9,697,492 B1* | 7/2017 | Birnbaum | G06F 16/95 |
| 10,007,882 B2* | 6/2018 | Belenzon | G06N 7/005 |
| 10,114,823 B2* | 10/2018 | Carlsson | G06F 16/3334 |
| 10,509,862 B2* | 12/2019 | Wang | G06F 40/129 |
| 10,810,685 B1* | 10/2020 | Pei | G06F 16/9535 |
| 10,817,527 B1* | 10/2020 | Setlur | G06F 3/04847 |
| 10,839,154 B2* | 11/2020 | Galitsky | G06F 40/30 |
| 10,853,578 B2* | 12/2020 | Dev | G06F 40/30 |
| 2005/0065806 A1 | 3/2005 | Harik | |
| 2005/0108001 A1* | 5/2005 | Aarskog | G06F 40/289 |
| | | | 704/10 |
| 2005/0216335 A1 | 9/2005 | Fikes et al. | |
| 2007/0220037 A1* | 9/2007 | Srivastava | G06F 16/3338 |
| 2008/0077570 A1* | 3/2008 | Tang | G06F 16/3346 |
| 2008/0140524 A1 | 6/2008 | Anand et al. | |
| 2008/0249855 A1 | 10/2008 | Collins et al. | |
| 2010/0063876 A1 | 3/2010 | Godden et al. | |
| 2011/0035377 A1* | 2/2011 | Wang | G06F 16/95 |
| | | | 707/737 |
| 2011/0055192 A1* | 3/2011 | Tang | G06F 16/951 |
| | | | 707/706 |
| 2011/0078205 A1* | 3/2011 | Salkeld | G06F 16/3344 |
| | | | 707/794 |
| 2011/0093449 A1* | 4/2011 | Belenzon | G06N 7/005 |
| | | | 707/708 |
| 2011/0246182 A1* | 10/2011 | Allen | G06F 40/289 |
| | | | 704/9 |
| 2011/0258054 A1* | 10/2011 | Pandey | G06Q 30/02 |
| | | | 705/14.72 |
| 2012/0030015 A1 | 2/2012 | Brunsman et al. | |
| 2012/0150636 A1 | 6/2012 | Freeman et al. | |
| 2013/0036107 A1* | 2/2013 | Benyamin | G06F 16/31 |
| | | | 707/709 |
| 2014/0040712 A1 | 2/2014 | Chang et al. | |
| 2015/0127650 A1* | 5/2015 | Carlsson | G06F 16/93 |
| | | | 707/737 |
| 2016/0004766 A1* | 1/2016 | Danielyan | G06F 40/20 |
| | | | 707/723 |
| 2017/0264578 A1 | 9/2017 | Allen et al. | |
| 2017/0357633 A1* | 12/2017 | Wang | G06F 40/289 |
| 2018/0053234 A1* | 2/2018 | Sun | G06N 7/00 |
| 2018/0130089 A1* | 5/2018 | Allouche | G06Q 30/0276 |
| 2019/0057310 A1* | 2/2019 | Olmstead | G06F 40/211 |
| 2019/0138595 A1* | 5/2019 | Galitsky | G06F 40/253 |
| 2019/0188590 A1* | 6/2019 | Wu | H04L 51/02 |
| 2019/0272325 A1* | 9/2019 | Korn | G06F 40/166 |
| 2019/0279409 A1* | 9/2019 | Kim | G06F 16/3329 |
| 2019/0304157 A1* | 10/2019 | Amer | G06N 3/0454 |
| 2019/0392487 A1* | 12/2019 | Duke | G06N 3/04 |
| 2020/0050636 A1* | 2/2020 | Datla | G06F 16/2379 |
| 2020/0050668 A1* | 2/2020 | Dev | G06N 20/00 |
| 2020/0065342 A1* | 2/2020 | Panuganty | G06F 16/632 |
| 2020/0410166 A1* | 12/2020 | Galitsky | G06F 40/30 |
| 2021/0271818 A1* | 9/2021 | Sar Shalom | G06F 40/289 |

OTHER PUBLICATIONS

Seo, Minjoon et al. "Bidirectional Attention Flow for Machine Comprehension" ArXiv abs/1611.01603 (2017); 13 pages; https://arxiv.org/pdf/1611.01603.pdf (Year: 2017).*

Hasan, Khaldoon & Zamyatin, Alexander & Al-Shamery, Eman.; "Bidirectional RNN-based Attention Model for Jointly Intent Detection and Slot Filling"; Journal of Advanced Research in Dynamical and Control Systems; 10. 404-410; (2018); (Year: 2018).*

Adams, Heather. "AFPCorp: a corpus of advertisements for financial products." BIBLID 1133-1127 (2011) p. 377-412.

Sumi et al., ComicDiary: Representing Individual Experiences in a Comics Style, Ubicomp 2002, LNCS 2498, pp. 1-13.

Zhu et al. Aligning Books and Movies: Towards Story-Like Visual Explanations by Watching Movies and Reading Books, arXiv: 1506:06724v1 [cs.CV] Jun. 22, 2015, pp. 1-23.

Jain et al. Story Generation from Sequene of Independent Short Descriptions, arXiv: 1707.05501v2 [cs:CV] Aug. 21, 2017, pp. 1-7.

Reed et al. Generative Adversarial Text to Image Synthesis, arXiv: 1605.05396v2 [cs.NE] Jun. 5, 2016, pp. 1-10.

Laha et al. An Empirical Evaluation of Various Deep Learning Architectures for Bi-Sequence Classification Tasks, arXiv: 1607.04853v2 [cs.CL] Oct. 2, 2016, pp. 1-12.

Adams, Heather. "AFPCorp: a corpus of advertisements for financial products." BIBLID 1133-1127 (2011), pp. 1-36.

Kaggle, Display Advertising Challenge, https://www.Kaggle.com/c/criteo-display-ad-challenge/data, 2016, pp. 1-2.

Markman et al., "Implications of counterfactual structure for creative generation and analytical problem solving." Personality and Social Pyschology Bulletin 33.3 (2007), pp. 1-15.

Flaherty, Alice W., "Frontotemporal and dopaminergic control of idea generation and creative drive," Journal of Comparative Neurology 493.1 (2005), pp. 1-13.

Hardey M., "Generation C: content, creation, connections and choice," International Journal of Market Research 53.6 (2011), pp. 1-18.

* cited by examiner

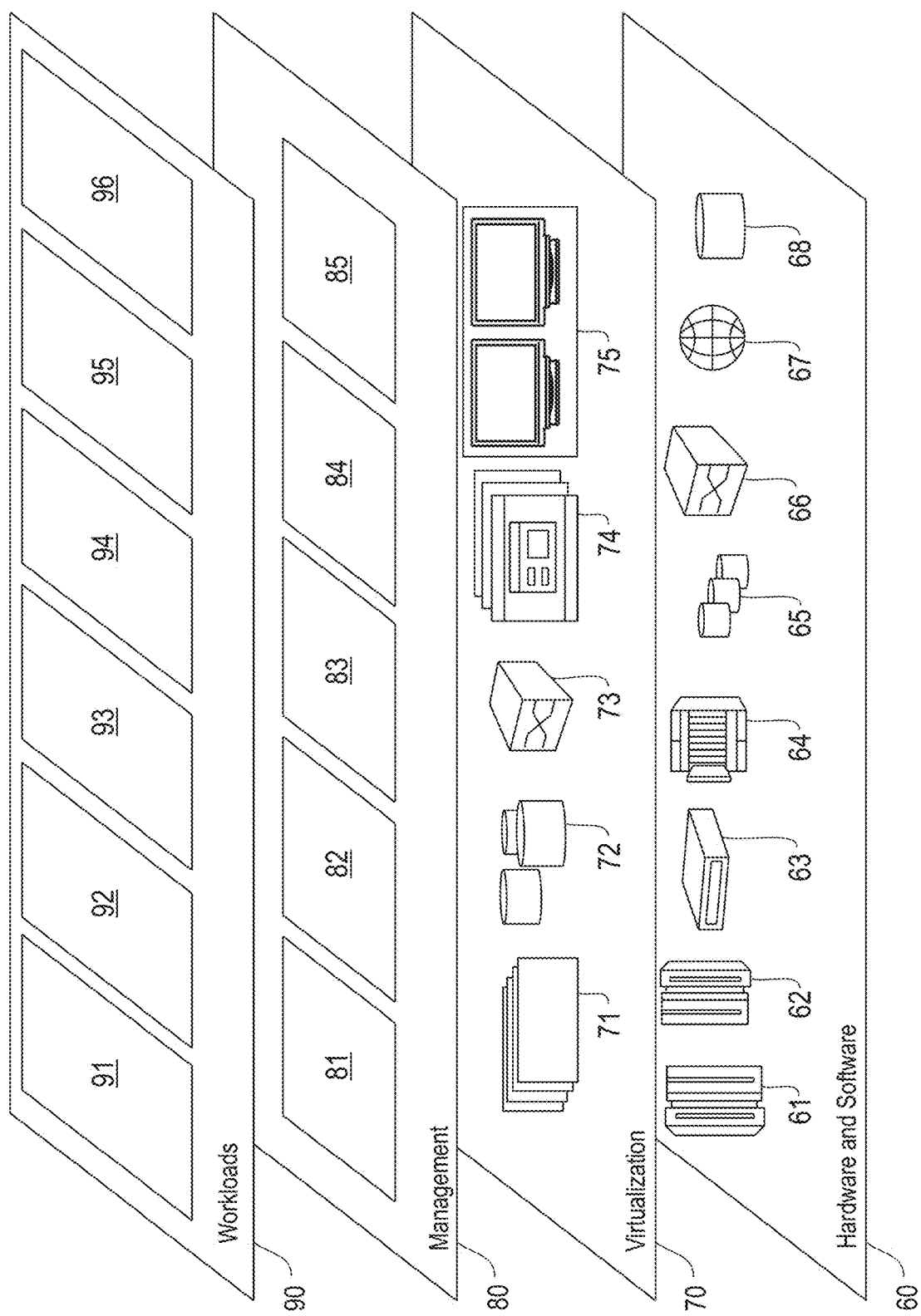

COGNITIVE ASSISTANT FOR CO-GENERATING CREATIVE CONTENT

FIELD

The present application generally relates to information technology, and, more particularly, to artificial intelligence (AI) implementations.

BACKGROUND

Cognitive assistants generally include artificial intelligence-based software programs capable of interacting with human users to assist with one or more types of processing tasks. Existing cognitive assistant systems can be used to process context, retrieve content based on the context, and present the retrieved content. However, such existing cognitive assistants typically cannot generate creative content in an automated fashion, nor can such systems be implemented as part of an interactive co-creation process of creative content with human users.

SUMMARY

In one embodiment of the present invention, a cognitive assistant for co-generating creative content is provided. An exemplary computer-implemented method can include obtaining semantic-level inputs from at least one user, wherein the semantic-level inputs pertain to multiple aspects of a desired content narrative; generating textual content based at least in part on the semantic-level inputs, wherein generating the textual content comprises applying one or more deep learning algorithms to the semantic-level inputs; generating image content based at least in part on the generated textual content; creating the desired content narrative by integrating (i) the generated textual content and (ii) the generated image content; and outputting the desired content narrative to the at least one user.

In another embodiment of the invention, an exemplary computer-implemented method can include generating textual content based at least in part on the semantic-level inputs, wherein generating the textual content comprises applying one or more rule-based heuristic techniques to the semantic-level inputs; generating image content based at least in part on the generated textual content; creating the desired content narrative by integrating (i) the generated textual content and (ii) the generated image content; generating one or more items of feedback pertaining to modifying one or more of the semantic-level inputs based at least in part on an evaluation score calculated for one or more portions of the desired content narrative; creating an updated version of the desired content narrative by updating each portion of the desired content narrative that is related to the one or more modified semantic-level inputs; and outputting the updated content narrative to at least one user.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 8 depicts abstraction model layers according to an embodiment of the present invention.

DETAILED DESCRIPTION

Figure 1:
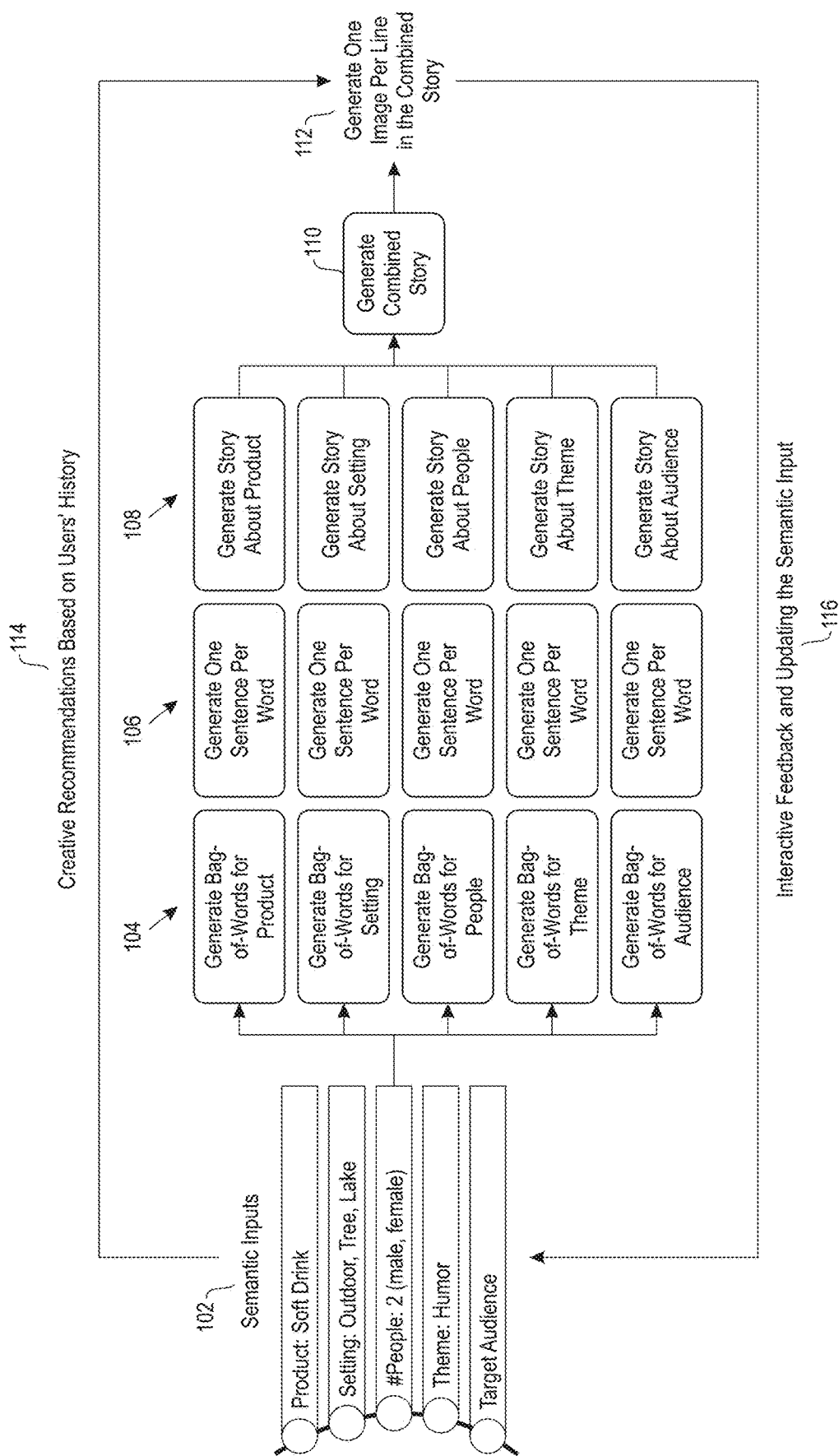
FIG. 1 is a diagram illustrating an example embodiment of the invention.

As described herein, an embodiment of the present invention includes automatically generating creative content in the form of a story (which can include a text sequence and/or visual concepts and/or images) using abstract semantic-level inputs from a human user. At least one embodiment of the invention can include receiving input parameters from a user, wherein such parameters can include product information, setting information, participant information, audience information, thematic information, etc. Such an embodiment can also include mapping each received parameter to a bag-of-words (BOW) model, and creating one sentence per word using recurrent neural networks (RNNs), thereby creating a coherent story about one or more products.

One or more embodiments of the invention can additionally include generating one image corresponding to each sentence using an image generator, such as, for instance, a pre-trained conditional generative adversarial network (GAN) model which takes the sentence as input and generates representative image. For example, the image at time "t+1" is based on the image at the $t^{th}$ line of the story. Further, in such an embodiment, each created sentence can be fused and/or integrated with the corresponding generated image, and the combination can be provided as an output.

As detailed herein, an example implementation of one or more embodiments of the invention includes an advertisement (ad) context. Such an embodiment can include automatic generation of an ad story concept (that is, a textual sequence) and the concept story board (that is, a sequence of images with text) using only abstract semantic-level inputs from one or more human users.

For example, consider a scenario wherein the objective includes creating a humorous ad concept for a soft drink involving two people in an outdoor environment. In accordance with such an example scenario, one or more embodiments of the invention can include updating the story concept and the concept story board by updating abstract semantic-level inputs. For instance, assume that it is desired that an element of romance be added to the ad concept. At least one embodiment of the invention can include co-creating the updated/desired ad concepts and concept story board by suggesting one or more semantic-level inputs (such as, inputs directed to a romantic setting) to the user. Such a suggestion, for example, might include a suggestion that an indoor environment is more preferable for the ad concept. User feedback can be collected for different environment settings over time, and such feedback can be stored as a preferred repository of environmental setting combination. Accordingly, in one or more embodiments of the invention, this repository can be used to provide suggestions to the user.

As detailed herein, inputs for story creation can include semantic-level inputs such as mood information, setting information, product name(s), target audience information, etc. Using such inputs, at least one embodiment of the invention includes automatically identifying one or more entities that will participate in the story. Additionally, such an embodiment includes generating textual and image content based on the identified entities as well as one or more provided semantic-level inputs (such as, for example, an indoor environment, a cold drink, etc.).

One or more embodiments of the invention can also include automatically identifying and/or providing feedback pertaining to input that can be changed to improve the story creation, as per one or more target audiences. For example, such an embodiment can include generating an evaluation score for judging generated content, and using such an evaluation score to recommend one or more input modifications via a feedback mechanism. As used here, an evaluation score computes the coverage of input semantic concepts in the generated content.

Such an embodiment can additionally include updating the generated story with the recommended and/or changed input(s). For example, if a weather parameter is changed (or recommended to be changed) from "winter" to "summer," only the parts of the story which require change will be updated, without affecting other aspects of the story.

As further detailed herein, one or more embodiments of the invention can include generating multi-modal concept data using advanced deep learning techniques, and one or more embodiments of the invention can include generating multi-modal concept data using heuristics-based rule-based methods.

FIG. 1 is a diagram illustrating an example embodiment of the invention. By way of illustration, FIG. 1 depicts a set of semantic inputs 102. Based on these semantic inputs 102, step 104 includes generating a bag-of-words (BOW) model for each of the semantic inputs (product information, setting information, people/participant information, theme information, audience information, etc.). As will be appreciated by one skilled in the art, a bag-of-words model can include a collection of all words provided as input (for which there is no sequential information).

For example, in an embodiment implementing one or more deep learning techniques, generating bag-of-words models can include using WordNet synsets to obtain relations of the input words. For every relation, Word2vec can be used to extract similar keywords (which can be trained via one or more online information sources). For example, consider a cola product: WordNet relations might include soft drink, beverage, drink, drinkable, potable, etc., while Word2vec might extract fruit_juice, fizzy_drinks, beer, drinks, alcoholic_drink, drank, alcohol, carbonated, fruity, rosé, fermented, purified, tasting, bitters, water, effluent, wastewater, reverse_osmosis, chlorinated, groundwater, etc. Using historical data, one or more of the Word2vec-extracted words can be filtered out.

Additionally, in an embodiment implementing heuristics based rule-based methods, generating bag-of-words models can include using a large corpus of previous relevant content (such as advertisements, third party data, public datasets, etc.). Based on the corpus of relevant content, such an embodiment can include calculating frequency values for word pairs, and identifying the most frequently occurring word in one or more categories. For a given keyword and/or category, the most commonly used words can be retrieved and utilized.

Step 106 includes generating sentences based on the generated BOW models. By way merely of example, given "soft drink" as an input semantic word, the Word2vec similarity model can retrieve two semantically similar words: alcohol and tasting. The skip thought model can then generate the following two sentences, one for each world: Sentence1: Even his ability to find alcohol for an event was adventurous. Sentence2: No, it's fine; I just can't imagine it tasting good.

In an embodiment implementing one or more deep learning techniques, generating sentences can include using a skip-thought model such that the sentence uses the word in question. For every word, a Word2vec embedding can be given as input, and a sentence can be generated for every word in the bag-of-words. This model can be trained, for example, using data from one or more online information sources.

Additionally, in an embodiment implementing heuristics based rule-based methods, generating sentences can include using one or more online information sources and/or dataset to build a probabilistic language model for sentences, as $P(i+1^{th}$ word given the i words). Given a list of keywords, such an embodiment can include building a sentence using the language model. Additionally, in one or more embodiments of the invention, the sentence need not be grammatically correct.

Additionally, step 108 includes generating a story for each of the semantic inputs, based on the generated sentences. By way of example, in an embodiment implementing heuristics based rule-based methods, generating a (coherent) story for one semantic input/constraint can include, given N sentences, selecting a subset of K sentences and shuffling and/or mixing up the K sentences to maintain coherence. A bi-directional attention-based RNN model can ensure that the highest coherent story is returned. For instance, given two sentences, $s_i$ and $s_{i+1}$, let coherence($s_i$, $s_{i+1}$)=entity_score($s_i$, $s_{i+1}$)+verb_score($s_i$, $s_{i+1}$), wherein both entity_score and verb_score can be learned from an online information data source corpus. Intuitively, such an equation indicates, for the two given sentences, the correlation between their entities and verbs. If this coherence score is high, then the sentences are coherent with each other. Additionally, one or more embodiments of the invention can include computing coherence for every pair of sentences in the collection of N sentences, and taking the longest set of sentences having a coherence score above a given threshold.

Accordingly, given the set of input parameters 102, one or more embodiments of the invention include processing each of the inputs in parallel using sequential steps: generating bag-of-words models (step 104), which includes pre-processing the input value of each input to a corresponding BOW representation; generating one sentence per word (step 106), which includes, for each word, using a sentence encoder to generate a sentence; and generating a (coherent) story about the product(s) in question (step 108), which includes, given set of independent sentences corresponding to multiple words of the inputs, generating a coherent story using a generative model.

Referring again to FIG. 1, step 110 includes generating a combined/overall story based on the stories generated in step 108. In one or more embodiments of the invention, step 110 can include aggregating individual generated stories per parameter, using an aggregator, thereby producing a single coherent textual story.

Step 112 includes generating one image per line in the combined story (for example, generating a picture board). In one or more embodiments of the invention, such images can be generated originally by the system with respect to the input line. For example, step 112 can include generating one image for every line of the combined story using a pre-trained conditional generative model, such that image at time t+1 is conditioned on image at time t. By way of example, in an embodiment implementing heuristics based rule-based methods, generating such images (for example, generating a picture board) can include, for each story, obtaining, from an annotated dataset, an image of each corresponding entity, each corresponding action, and each corresponding scene object, and stitching together the obtained images in accordance with the story sequence.

As also depicted in FIG. 1, at least one embodiment of the invention includes step 114, which includes updating the story with one or more items of semantic input derived from user histories. Additionally, such an embodiment includes step 116, which includes generating a creative suggestion via an interactive feedback mechanism. Such an embodiment can additionally update the semantic inputs based on the generated suggestions. In one or more embodiments of the invention, one or more users can rank the multimodal outputs, and based on such user ratings, such an embodiment can include suggesting which input parameter to sample and also which value of the parameter to suggest.

Such an embodiment can include implementing a continuous learning mechanism which scores a combination of inputs as per their likeability, and appropriately provides personalized suggestions to the user based on the determined scores. In one or more embodiments of the invention, "likeability" can be measured directly, obtained as input from one or more users, as user feedback. Additionally, desired changes provided by the user can be taken by the system and, using an interpolation mechanism, can be implemented and reflected in a generated output (story).

Figure 2:
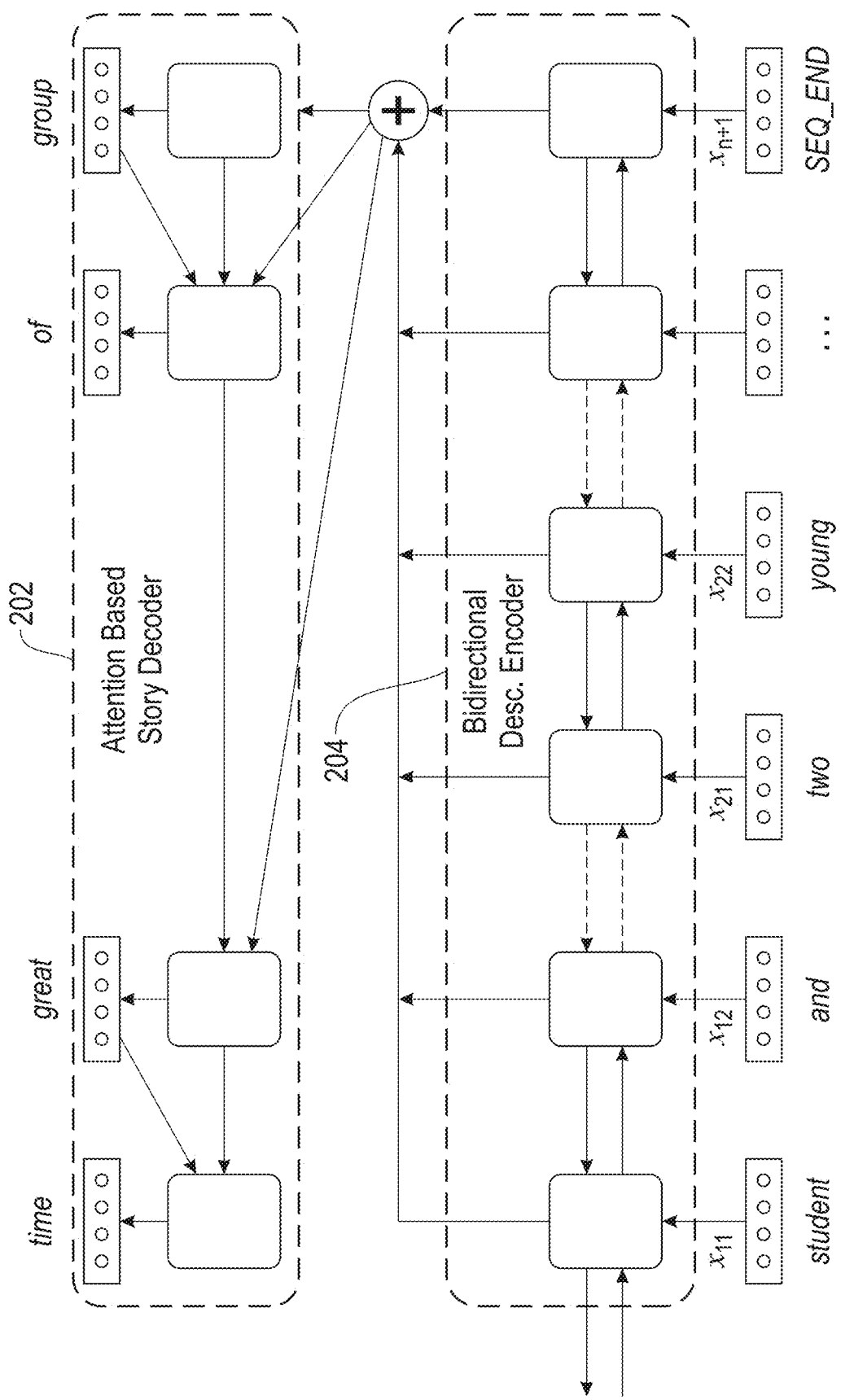
FIG. 2 is a diagram illustrating system architecture, according to an exemplary embodiment of the invention.

FIG. 2 is a diagram illustrating system architecture, according to an embodiment of the invention. By way of illustration, FIG. 2 depicts an attention-based story decoder 202 and a bidirectional description encoder 204. Specifically, FIG. 2 details a sequence-to-sequence-based generative model, which combines multiple stories generated by different generative modules into a single (coherent) story. The model is implemented using a sequence-to-sequence recurrent neural network (seq2seq). As depicted, a bidirectional encoder 204 processes the set of independent descriptions separated by a delimiter and a sequence end-marker marking the end of the sentence. The encoder 204 outputs a list of latent encodings corresponding to each input which is given to the attention enabled decoder 202, which generates a coherent story sequence based on the provided input.

Figure 3:
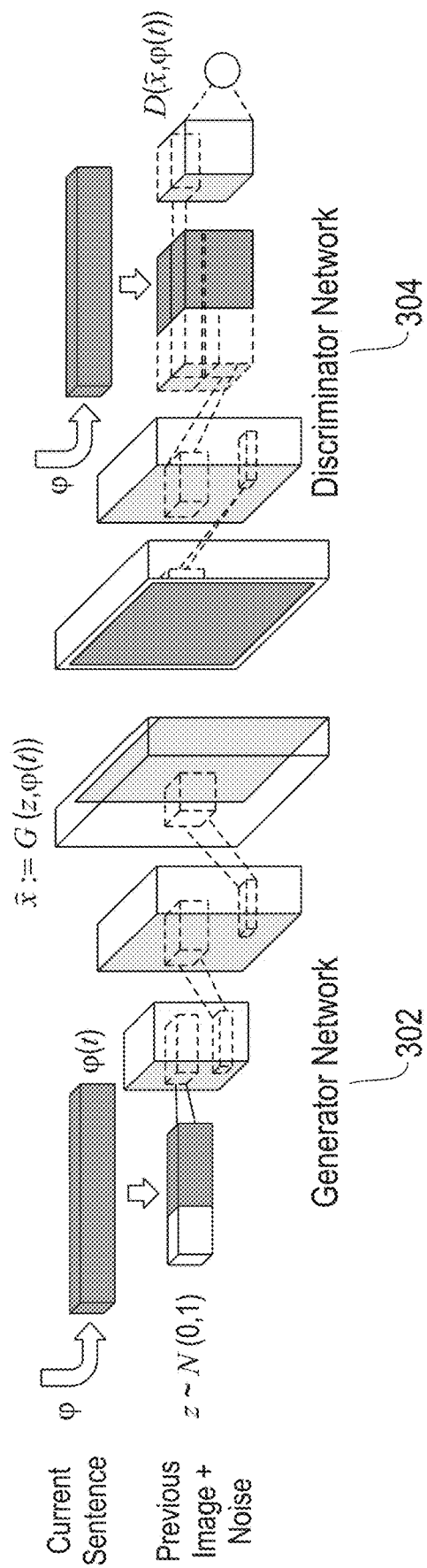
FIG. 3 is a diagram illustrating system architecture, according to an exemplary embodiment of the invention.

FIG. 3 is a diagram illustrating system architecture, according to an embodiment of the invention. By way of illustration, FIG. 3 depicts a generator network 302 and a discriminator network 304. As detailed herein, one or more embodiments of the invention includes using a generative adversarial network to generate images for a creative output (such as a picture board, for example), given a current sentence and the previous image (in the story sequence). Such a generative adversarial network can include generator (G) network 302 and discriminator (D) network 304.

Referring to FIG. 3, latent representation of the input text can be obtained using text encoders such as a character level convolutional neural network (CNN) or long-short term memory (LSTM). Similarly, latent representation for the input image can be obtained using an image encoder such as, for example, a deep convolutional neural network. Further, using both the latent representations and random noise, a synthetic image can be generated. Image generation can include a feed-forward inference in the generator (G) network 302, conditioned on input noise and representations. Generator (G) network 302 and discriminator (D) network (304) can be trained in a minimax setting, wherein the discriminator network 304 attempts to distinguish real training data from synthetic images, and the generator network 302 attempts to fool the discriminator network 304.

Figure 4:
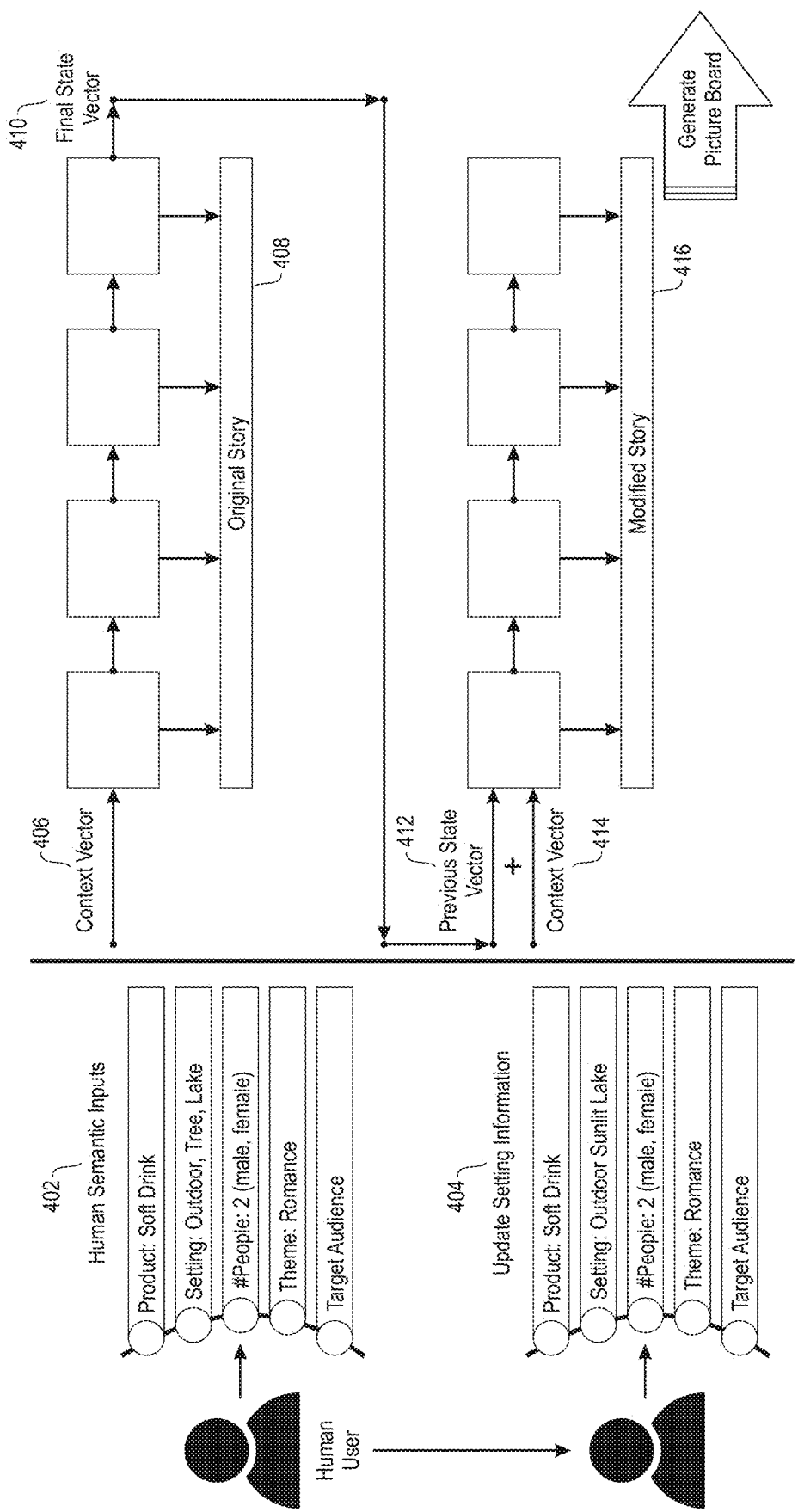
FIG. 4 is a diagram illustrating system architecture, according to an exemplary embodiment of the invention.

FIG. 4 is a diagram illustrating system architecture, according to an embodiment of the invention. By way of illustration, FIG. 4 depicts human-provided semantic inputs 402 and updated semantic inputs 404 (wherein the setting information has been changed). Additionally, FIG. 4 depicts a context vector 406, which is processed to generate a final state vector 410 and an original story 408. By way of example, the original story 408 might include the following text: "They decided to meet and watch the sunset together. It was already an hour past sunset, yet he hadn't arrived. When he finally arrived, her frustration was evident. Finally, he bought her a soft drink as a friendly gesture."

Additionally, using a conditional RNN-language model, one or more embodiments of the invention can include processing a previous state vector 412 (which, in one or more embodiments of the invention, can be the final state vector 410) and a context vector 414 (which is based on the updated semantic input information) to generate a modified story 416 (which can be used to generate a picture board). In conjunction with the above-noted example, an example modified story 416 might include the following text: "They decided to meet and go for lunch together. It was already an hour past lunch time, yet he hadn't arrived. When he finally arrived, her frustration was evident. Finally, he bought her a soft drink as a friendly gesture."

Figure 5:
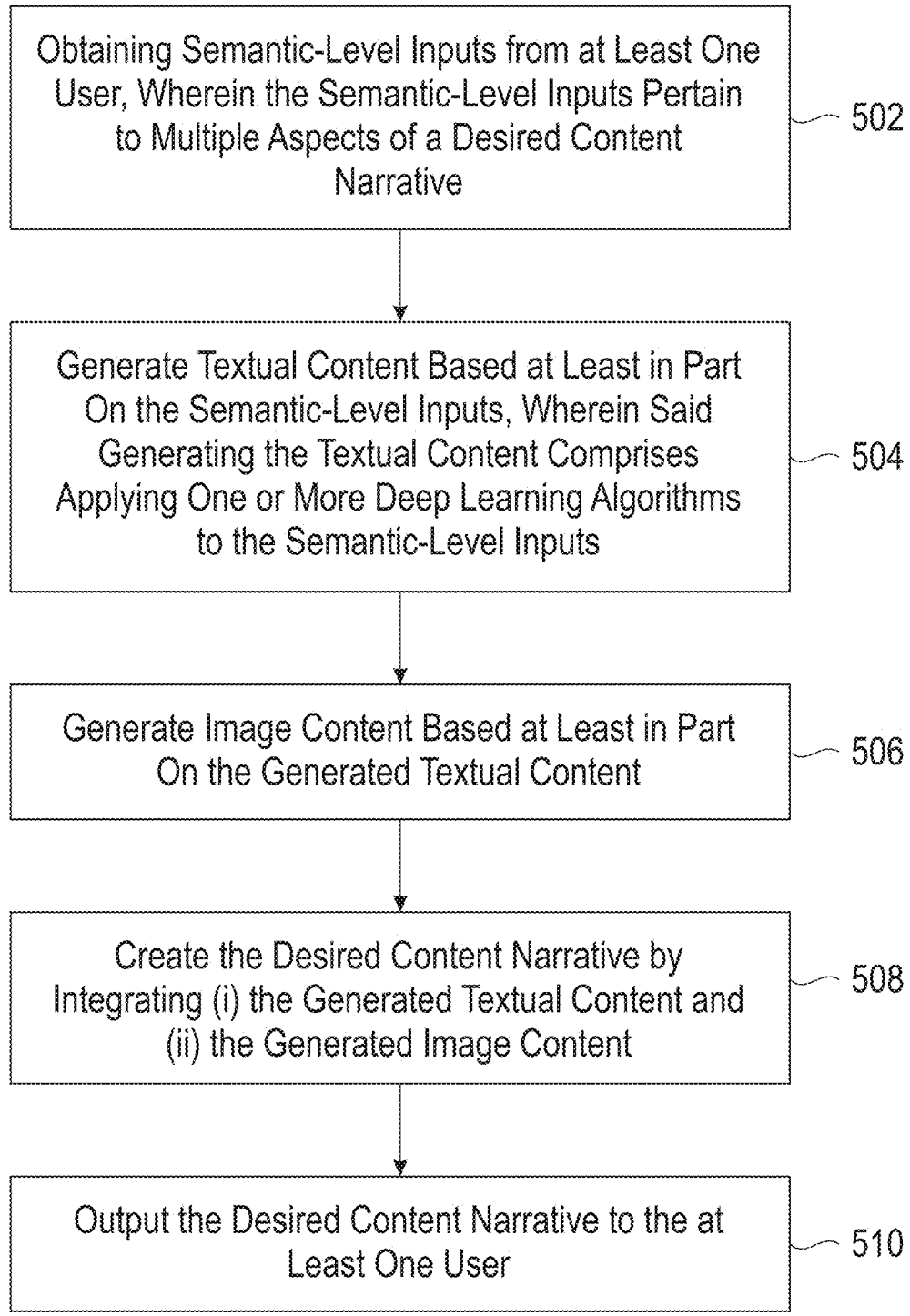
FIG. 5 is a flow diagram illustrating techniques according to an embodiment of the invention.

FIG. 5 is a flow diagram illustrating techniques according to an embodiment of the present invention. Step 502 includes obtaining semantic-level inputs from at least one user, wherein the semantic-level inputs pertain to multiple aspects of a desired content narrative. The semantic-level inputs can include, for example, (i) mood information, (ii) setting information, (iii) product information, (iv) target audience information, (v) entity-related information, and/or (vi) thematic information.

Step 504 includes generating textual content based at least in part on the semantic-level inputs, wherein said generating the textual content comprises applying one or more deep learning algorithms to the semantic-level inputs. In at least one embodiment of the invention, the one or more deep learning algorithms can include one or more bag-of-words models. Step 506 includes generating image content based at least in part on the generated textual content. Generating the image content can include implementing a pre-trained conditional generative model.

Step 508 includes creating the desired content narrative by integrating (i) the generated textual content and (ii) the generated image content. Step 510 includes outputting the desired content narrative to the at least one user. In at least one embodiment of the invention, the desired content narrative can include an advertisement for one or more products and/or one or more services.

Also, an additional embodiment of the invention includes generating textual content based at least in part on the semantic-level inputs, wherein generating the textual content comprises applying one or more rule-based heuristic techniques to the semantic-level inputs. Such an embodiment can also include generating image content based at least in part on the generated textual content, and creating the desired content narrative by integrating (i) the generated textual content and (ii) the generated image content. Further, such an embodiment can include generating one or more items of feedback pertaining to modifying one or more of the semantic-level inputs based at least in part on an evaluation score calculated for one or more portions of the desired content narrative, creating an updated version of the desired content narrative by updating each portion of the desired content narrative that is related to the one or more modified semantic-level inputs, and outputting the updated content narrative to at least one user.

The techniques depicted in FIG. 5 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 5 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 6:
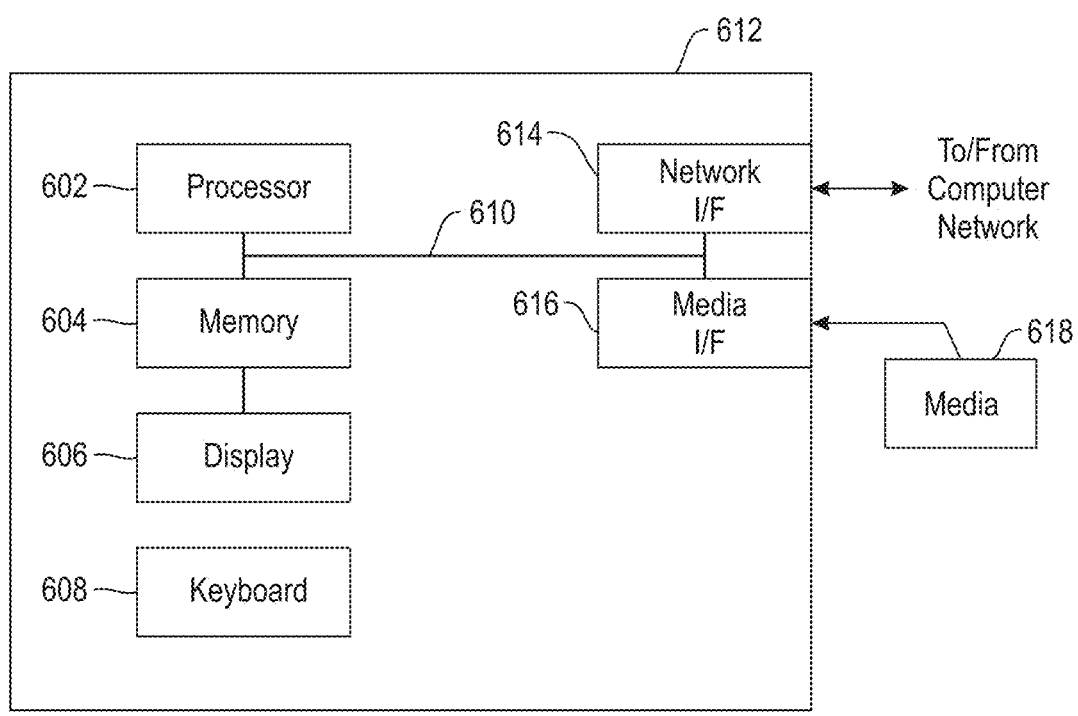
FIG. 6 is a system diagram of an exemplary computer system on which at least one embodiment of the invention can be implemented.

Additionally, an embodiment of the present invention can make use of software running on a computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor.

The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 602. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
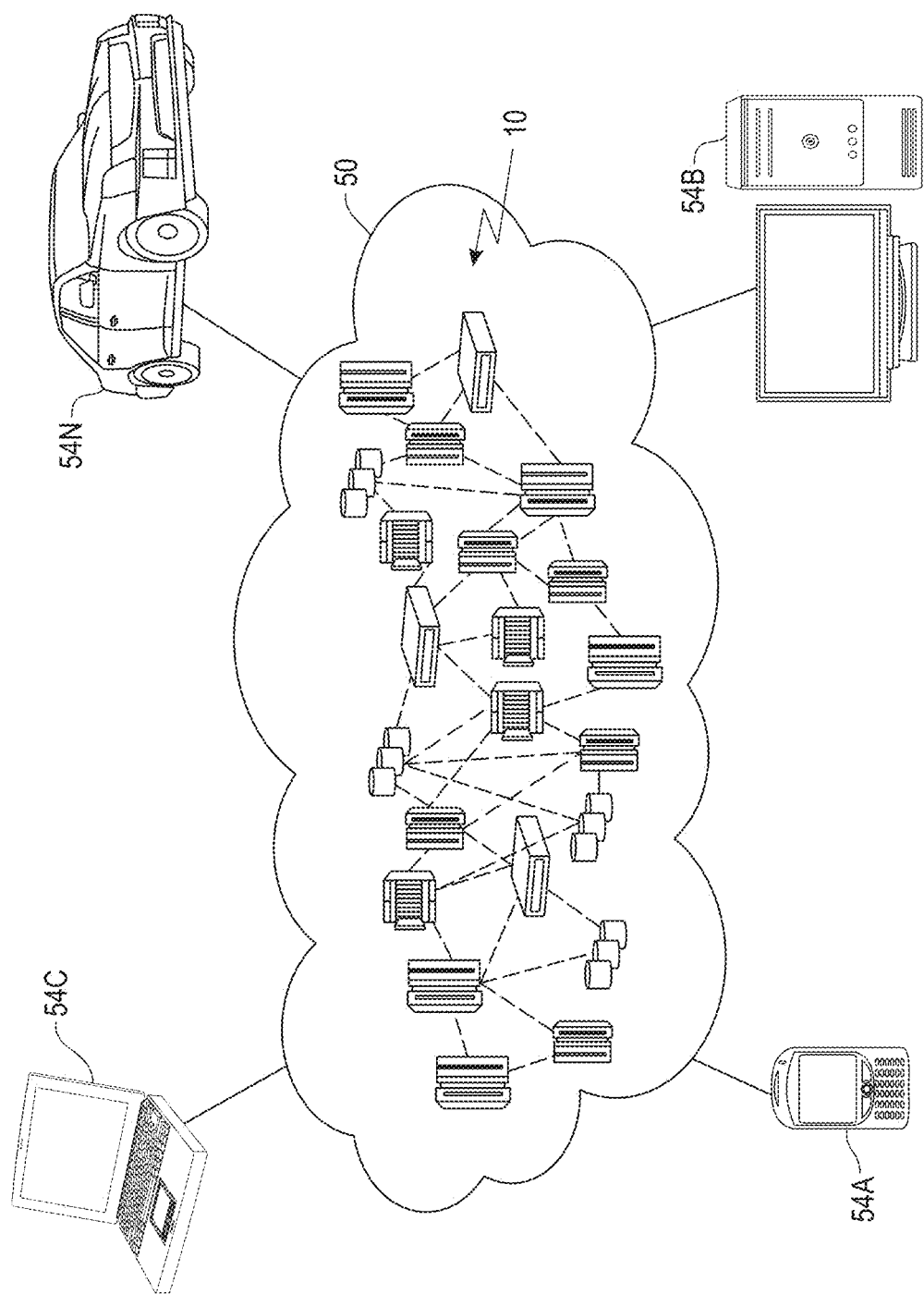
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and creative content co-generation 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, mapping each parameter to a bag of words, creating one sentence per word and generating one image corresponding to each created sentence.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
    obtaining semantic-level inputs from at least one user, wherein the semantic-level inputs pertain to multiple aspects of a desired content narrative;
    generating a bag-of-words models by:
        determining relations and similar keywords of at least the semantic-level inputs using a database synset and at least one natural language processing algorithm; and
        calculating frequency values for word pairs within at least one corpus of content related to at least a portion of the semantic-level inputs, and identifying one or more frequently occurring words in one or more categories;
    generating textual content based at least in part on the semantic-level inputs, wherein said generating the textual content comprises applying one or more deep learning algorithms to the semantic-level inputs by (i) mapping each of the semantic-level inputs to the bag-of-words model and (ii) creating one sentence per word, for three or more words, within the semantic-level inputs, using one or more bi-directional attention-based recurrent neural networks and based at least in part on said mapping, wherein creating one sentence per word using the one or more bi-directional attention-based recurrent neural networks comprises generating a story by (a) correlating, for each of two or more sets of two sentences, between entities of the two different sentences and verbs of the two different sentences, (b) computing a coherence score for each of the two or more sets of two sentences based at least in part on the correlating, and (c) identifying the longest set of two sentences, from the two or more sets, having a coherence score above a given threshold for use in the story;
    generating image content based at least in part on the generated textual content;
    creating the desired content narrative by integrating (i) the generated textual content and (ii) the generated image content; and
    outputting the desired content narrative to the at least one user;
    wherein the method is carried out by at least one computing device.

2. The computer-implemented method of claim 1, wherein the semantic-level inputs comprise mood information.

3. The computer-implemented method of claim 1, wherein the semantic-level inputs comprise setting information.

4. The computer-implemented method of claim 1, wherein the semantic-level inputs comprise product information.

5. The computer-implemented method of claim 1, wherein the semantic-level inputs comprise target audience information.

6. The computer-implemented method of claim 1, wherein the semantic-level inputs comprise entity-related information.

7. The computer-implemented method of claim 1, wherein the semantic-level inputs comprise thematic information.

8. The computer-implemented method of claim 1, wherein the desired content narrative comprises an advertisement for at least one of (i) one or more products and (ii) one or more services.

9. The computer-implemented method of claim 1, wherein said generating the image content comprises implementing a pre-trained conditional generative model.

10. A computer program product comprising a computer readable storage medium having program instructions embodied therewith, the program instructions executable by a computing device to cause the computing device to:
obtain semantic-level inputs from at least one user, wherein the semantic-level inputs pertain to multiple aspects of a desired content narrative;
generate a bag-of-words models by:
determining relations and similar keywords of at least the semantic-level inputs using a database synset and at least one natural language processing algorithm; and
calculating frequency values for word pairs within at least one corpus of content related to at least a portion of the semantic-level inputs, and identifying one or more frequently occurring words in one or more categories;
generate textual content based at least in part on the semantic-level inputs, wherein said generating the textual content comprises applying one or more deep learning algorithms to the semantic-level inputs by (i) mapping each of the semantic-level inputs to the bag-of-words model and (ii) creating one sentence per word, for three or more words, within the semantic-level inputs, using one or more bi-directional attention-based recurrent neural networks and based at least in part on said mapping, wherein creating one sentence per word using the one or more bi-directional attention-based recurrent neural networks comprises generating a story by (a) correlating, for each of two or more sets of two sentences, between entities of the two different sentences and verbs of the two different sentences, (b) computing a coherence score for each of the two or more sets of two sentences based at least in part on the correlating, and (c) identifying the longest set of two sentences, from the two or more sets, having a coherence score above a given threshold for use in the story;
generate image content based at least in part on the generated textual content;
create the desired content narrative by integrating (i) the generated textual content and (ii) the generated image content; and
output the desired content narrative to the at least one user.

11. The computer program product of claim 10, wherein the semantic-level inputs comprise at least one of (i) mood information, (ii) setting information, (iii) product information, (iv) target audience information, (v) entity-related information, and (vi) thematic information.

12. The computer program product of claim 10, wherein the desired content narrative comprises an advertisement for at least one of (i) one or more products and (ii) one or more services.

13. The computer program product of claim 10, wherein said generating the image content comprises implementing a pre-trained conditional generative model.

14. A system comprising:
a memory; and
at least one processor operably coupled to the memory and configured for:
obtaining semantic-level inputs from at least one user, wherein the semantic-level inputs pertain to multiple aspects of a desired content narrative;
generating a bag-of-words models by:
determining relations and similar keywords of at least the semantic-level inputs using a database synset and at least one natural language processing algorithm; and
calculating frequency values for word pairs within at least one corpus of content related to at least a portion of the semantic-level inputs, and identifying one or more frequently occurring words in one or more categories;
generating textual content based at least in part on the semantic-level inputs, wherein said generating the textual content comprises applying one or more deep learning algorithms to the semantic-level inputs by (i) mapping each of the semantic-level inputs to the bag-of-words model and (ii) creating one sentence per word, for three or more words, within the semantic-level inputs, using one or more bi-directional attention-based recurrent neural networks and based at least in part on said mapping, wherein creating one sentence per word using the one or more bi-directional attention-based recurrent neural networks comprises generating a story by (a) correlating, for each of two or more sets of two sentences, between entities of the two different sentences and verbs of the two different sentences, (b) computing a coherence score for each of the two or more sets of two sentences based at least in part on the correlating, and (c) identifying the longest set of two sentences, from the two or more sets, having a coherence score above a given threshold for use in the story;
generating image content based at least in part on the generated textual content;
creating the desired content narrative by integrating (i) the generated textual content and (ii) the generated image content; and
outputting the desired content narrative to the at least one user.

15. A computer-implemented method, the method comprising:
obtaining semantic-level inputs from at least one user, wherein the semantic-level inputs pertain to multiple aspects of a desired content narrative;
generating a bag-of-words models by:
determining relations and similar keywords of at least the semantic-level inputs using a database synset and at least one natural language processing algorithm; and
calculating frequency values for word pairs within at least one corpus of content related to at least a portion of the semantic-level inputs, and identifying one or more frequently occurring words in one or more categories;
generating textual content based at least in part on the semantic-level inputs, wherein said generating the textual content comprises (i) applying one or more rule-based heuristic techniques to the semantic-level inputs, (ii) mapping each of the semantic-level inputs to the bag-of-words model, and (iii) creating one sentence per word, for three or more words, within the semantic-level inputs, using one or more bi-directional attention-based recurrent neural networks and based at least in part on said mapping, wherein creating one sentence per word using the one or more bi-directional attention-based recurrent neural networks comprises generating a story (a) correlating, for each of two or more sets of two sentences, between entities of the two different sentences and verbs of the two different sentences, (b) computing a coherence score for each of the or more sets of two sentences based at least in part on the correlating, and (c) identifying the longest set of two sentences, from the two or more sets, having a coherence score above a given threshold for use in the story;

generating image content based at least in part on the generated textual content;

creating the desired content narrative by integrating (i) the generated textual content and (ii) the generated image content;

generating one or more items of feedback pertaining to modifying one or more of the semantic-level inputs based at least in part on an evaluation score calculated for one or more portions of the desired content narrative;

creating an updated version of the desired content narrative by updating each portion of the desired content narrative that is related to the one or more modified semantic-level inputs; and outputting the updated content narrative to the at least one user;

wherein the method is carried out by at least one computing device.

16. The computer-implemented method of claim 15, wherein the semantic-level inputs comprise at least one of (i) mood information, (ii) setting information, (iii) product information, (iv) target audience information, (v) entity-related information, and (vi) thematic information.

17. The computer-implemented method of claim 15, wherein the desired content narrative comprises an advertisement for at least one of (i) one or more products and (ii) one or more services.

18. The computer-implemented method of claim 15, wherein said generating the image content comprises implementing a pre-trained conditional generative model.

* * * * *